(12) United States Patent
Braun et al.

(10) Patent No.: US 7,376,721 B2
(45) Date of Patent: May 20, 2008

(54) SYSTEM FOR INHIBITING INSTALLING A RADIO CONFIGURATION FILE ONTO A SOFTWARE DEFINED RADIO DEVICE UNLESS THE FILE IS COMPATIBLE WITH THE DEVICE

(75) Inventors: David A. Braun, Denville, NJ (US); Gregory M. Perkins, Pennington, NJ (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 219 days.

(21) Appl. No.: 10/565,973

(22) PCT Filed: Jul. 30, 2004

(86) PCT No.: PCT/US2004/024602

§ 371 (c)(1),
(2), (4) Date: Jan. 26, 2006

(87) PCT Pub. No.: WO2005/013540

PCT Pub. Date: Feb. 10, 2005

(65) Prior Publication Data

US 2006/0282497 A1    Dec. 14, 2006

Related U.S. Application Data

(60) Provisional application No. 60/491,121, filed on Jul. 30, 2003.

(51) Int. Cl.
*G06F 15/177* (2006.01)

(52) U.S. Cl. .................. 709/222; 709/221; 709/219
(58) Field of Classification Search ............. 709/221, 709/222, 219, 230; 455/418, 419, 403; 711/101; 713/191, 201; 380/270
See application file for complete search history.

(56) References Cited

U.S. PATENT DOCUMENTS

| | | | | |
|---|---|---|---|---|
| 6,954,634 | B1 * | 10/2005 | Bucknell et al. | 455/418 |
| 7,035,932 | B1 * | 4/2006 | Dowling | 709/230 |
| 2002/0144134 | A1 * | 10/2002 | Watanabe et al. | 713/191 |
| 2003/0083055 | A1 * | 5/2003 | Riordan et al. | 455/419 |
| 2003/0099358 | A1 * | 5/2003 | Michael et al. | 380/270 |
| 2003/0100297 | A1 * | 5/2003 | Riordan et al. | 455/418 |
| 2003/0158954 | A1 * | 8/2003 | Williams | 709/230 |
| 2004/0268148 | A1 * | 12/2004 | Karjala et al. | 713/201 |
| 2006/0015674 | A1 * | 1/2006 | Murotake | 711/101 |

* cited by examiner

*Primary Examiner*—Le Luu
(74) *Attorney, Agent, or Firm*—Harness, Dickey & Pierce, PLC (57) ABSTRACT

A method for securely connecting a software defined radio (SDR) to a server through a network is presented. A request to download a radio configuration (R-CFG) file is sent from the SDR device to the server. A determination is made that the R-CFG file is configured to control a plurality of radio frequency parameters for the SDR device solely within levels permitted by a regulatory agency. The R-CFG is then downloaded to the SDR device.

14 Claims, 12 Drawing Sheets

SYSTEM FOR INHIBITING INSTALLING A RADIO CONFIGURATION FILE ONTO A SOFTWARE DEFINED RADIO DEVICE UNLESS THE FILE IS COMPATIBLE WITH THE DEVICE

CROSS-REFERENCE TO RELATED APPLICATIONS

This application claims the benefit of U.S. Provisional Application No. 60/491,121, filed on Jul. 30, 2003. The disclosure of that application is incorporated herein by reference in its entirety for any purpose.

FIELD OF THE INVENTION

The present invention relates generally to wireless digital communications. More particularly, the present invention relates to a method for securely loading executable code onto a mobile device.

BACKGROUND OF THE INVENTION

A significant demand exists for mobile devices capable of communicating in any wireless standard such as code division multiple access (CDMA) or global system for mobile communications (GSM). A software defined radio (SDR) device exemplifies such a device.

In a SDR device, functions that were formerly carried out solely in hardware, such as the generation of the transmitted radio signal and the tuning of the received radio signal, are controlled by software. Because these functions are controlled by software, the radio is programmable, allowing it to transmit and to receive over a wide range of frequencies and to emulate virtually any desired transmission format. Accordingly, instead of discarding the SDR device when a technological advance occurs, the SDR device merely requires downloading a software upgrade referred to as a radio configuration (R-CFG) file to accommodate this change.

There are several disadvantages associated with the present method for dynamically loading a R-CFG onto a SDR device. First, an inefficient amount of messaging occurs between the SDR device and a server of a SDR device manufacturer during the process of loading the R-CFG onto the SDR device. Second, a lack of security exists to prevent downloading malicious code onto the SDR device. Third, the present method lacks an automatic method of ensuring that a R-CFG does not exceed a permitted operating parameter (e.g., the frequency, the modulation type, the output power, and the maximum field strength) associated with the SDR device. It is therefore desirable to have a system or a method that overcomes these disadvantages.

BRIEF DESCRIPTION OF THE DRAWINGS

The present invention will become more fully understood from the detailed description and the accompanying drawings, wherein:

FIGS. 5A-5C illustrate errors and timeout diagrams that occur during an exchange of messages between a SDR device and a server in accordance with one embodiment of the invention;

DETAILED DESCRIPTION OF THE PREFERRED EMBODIMENTS

The following description of the preferred embodiments is merely exemplary in nature and is in no way intended to limit the invention, its application, or uses. For purposes of clarity, the same reference numbers will be used in the drawings to identify similar elements.

The present invention defines a secure and efficient communications protocol that supports a wireless radio configuration (R-CFG) file download process to a software defined radio (SDR) device from a server. Mutual authentication occurs between the SDR device and the server to ensure malicious code is not loaded onto the SDR device. The SDR device then requests a R-CFG file from a server. The requested R-CFG file is downloaded over the air (OTA) to the SDR device. A device manager on the SDR device then determines whether the R-CFG file is compatible with the SDR device. A R-CFG file is compatible if the SDR device if the SDR device does not exceed its operating parameters as designated by a regulatory agency (RA) such as the Federal Communications Commission (FCC). Other compatibility issues involve whether the R-CFG matches the type of SDR device and the version of the computer program on the SDR device. In another embodiment, the server 140 determines the compatibility of the R-CFG file with the SDR device before downloading the R-CFG to the SDR device. In some embodiments, both the server and the SDR device determine one or more compatibility criteria. Thus, some or all compatibility criteria determinations can be performed redundantly.

Figure 1:
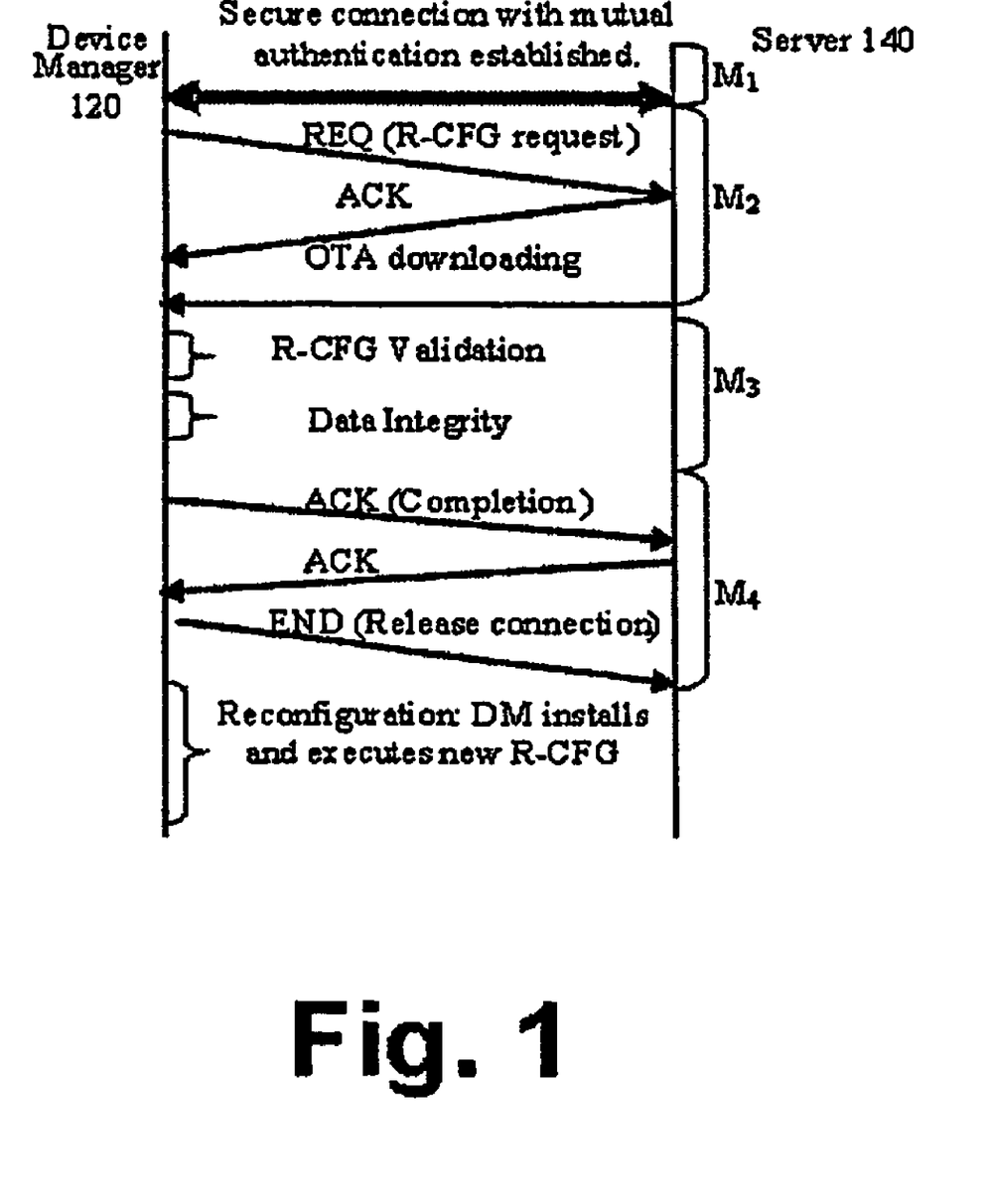
FIG. 1 illustrates messages exchanged between a software defined radio (SDR) device and a server in accordance with one embodiment of the invention.

Referring now to FIG. 1, a server 140, located at a SDR device manufacturer or a software company, is in communication with a device manager (DM) 120 on a SDR device. The DM 120 is a set of computer instructions configured to perform a variety of tasks associated with downloading a R-CFG file to the SDR device.

For simplicity, the communication protocol on the server 140 is divided into four modules; however, skilled artisans understand that more or less modules may also be used. Module one ($M_1$) through module four ($M_4$) use five distinct messages to download a R-CFG file to a SDR device. These messages include REQ, ACK, ERR-X where X is the index of the error from 1 to 3, DATA for packets, and END.

$M_1$ establishes a connection to a SDR DM 120 on a SDR device through the use of hypertext transfer protocol (HTTP), secure sockets layer (SSL) protocol, or lightweight SSL (LSSL). Preferably, SSL or LSSL are used when a more secure connection is necessary to protect confidential data.

Mutual authentication between the DM 120 of the SDR device 110 and the server 140 is performed to prevent malicious code from being loaded onto the SDR device. This is accomplished by the server 140 sending its RSA certificate to the DM 120. The DM 120 verifies the information in the RSA certificate. After authenticating the server 140, the DM 120 then provides information in a certificate that authenticates itself to the server 140.

Figure 2:
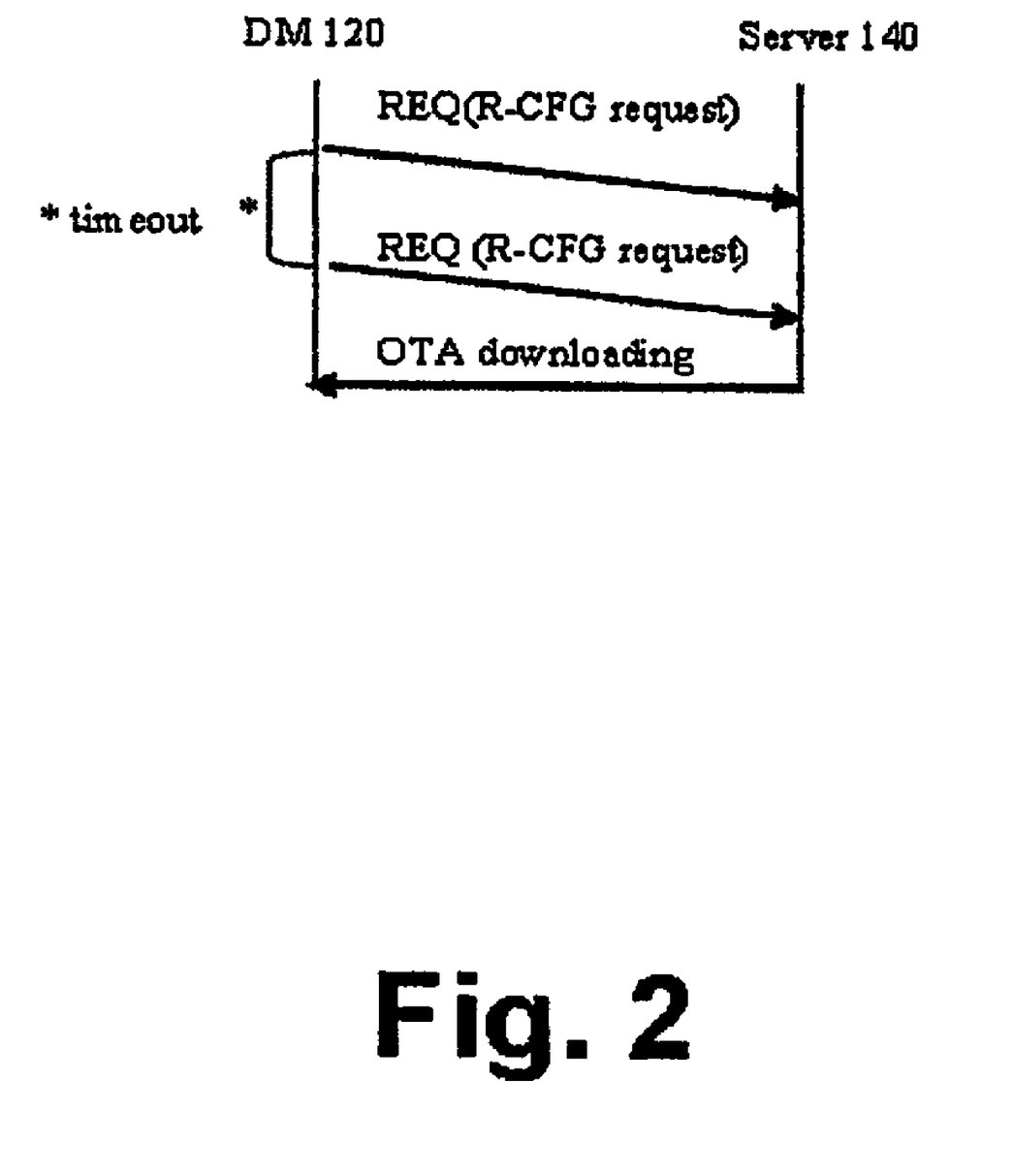
FIG. 2 illustrates a timeout and error diagram after a SDR device requests a radio configuration (R-CFG) file from a server in accordance with one embodiment of the invention.
Figure 3:
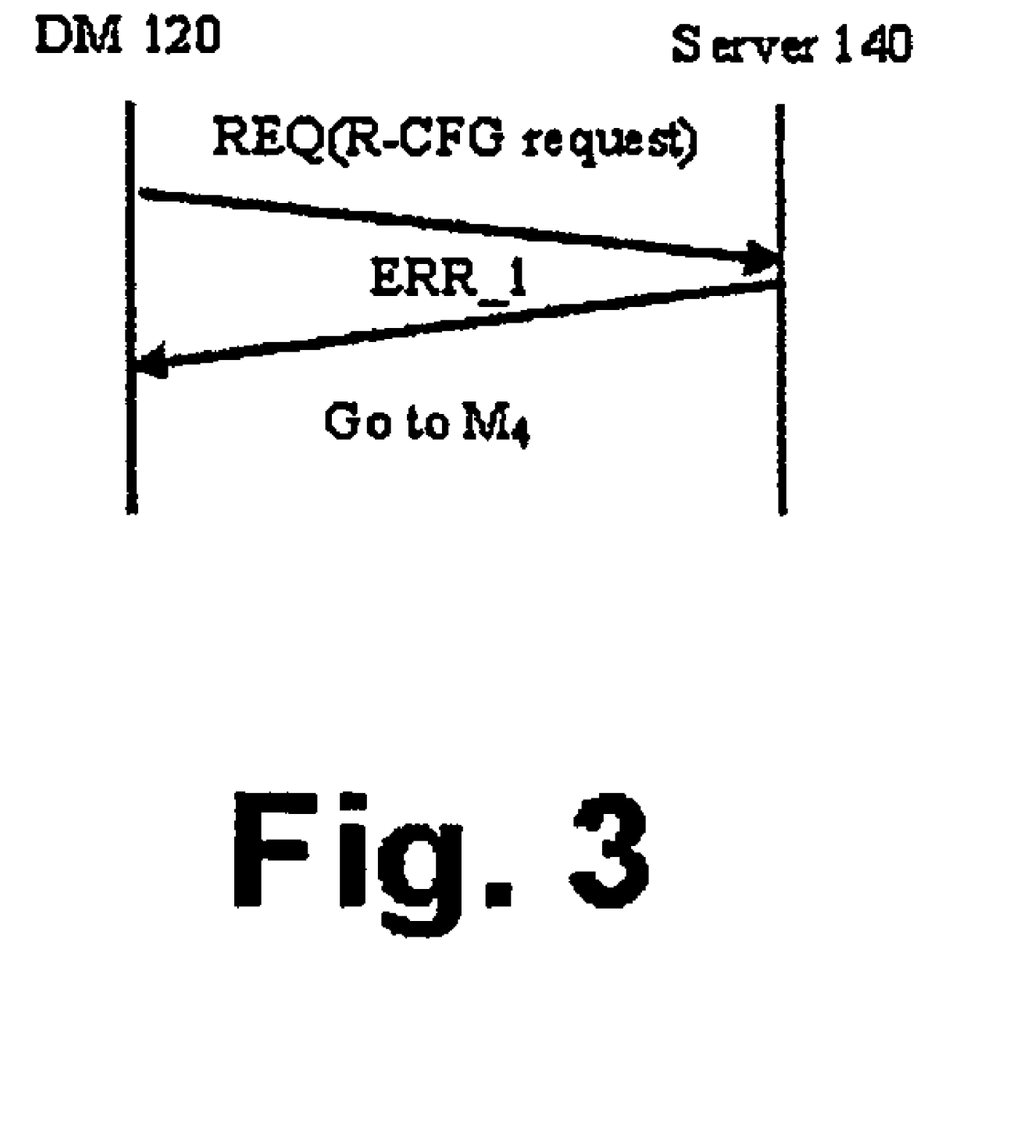
FIG. 3 illustrates an error diagram in accordance with one embodiment of invention.

After mutual authentication, $M_2$ is initiated. The DM 120 sends the R-CFG request message (i.e., REQ) over a network to the server 140. The server 140 determines whether it has access to the requested R-CFG. In the meantime, the DM 120 waits for an acknowledgement message (i.e. ACK) from the server 140 that confirms it has the requested R-CFG. If a timeout period expires without the DM 120 receiving such a response, the DM 120 resends the R-CFG request, up to k times, as shown in FIG. 2. If the server 140 replies with an ERR_1 message indicating that the server 140 does not have the proper R-CFG needed by the SDR device, the protocol's execution goes to $M_4$, as shown in FIG. 3.

Figure 4:
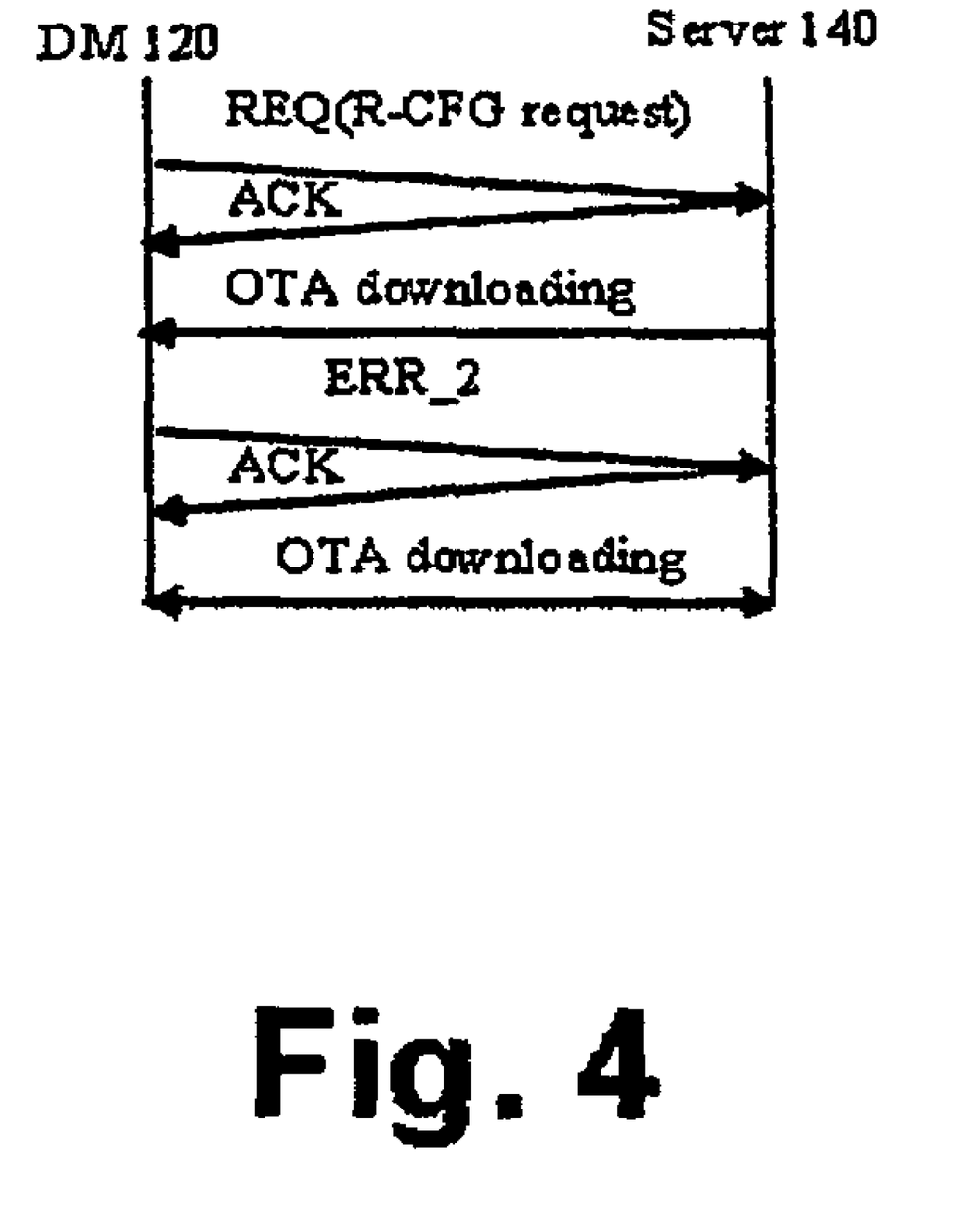
FIG. 4 illustrates an error diagram in accordance with one embodiment of the invention.

If an error occurs during the downloading of the R-CFG, the DM 120 of the SDR device sends an ERR_2 message, as shown in FIG. 4, indicating that the OTA download was not successfully completed. The server 140 then acknowledges the ERR_2 message by sending an ACK message to the DM 120. If an ERR_2 message was corrupted, the download process is restarted. To avoid completely restarting the downloading process, a download manager module is optionally integrated in the DM 120. This download manager module restarts the download process from the point at which the downloading process left off.

Generally, $M_3$ involves performing security computations related to the R-CFG. The DM 120 determines whether the R-CFG file meets certain security requirements such as whether the R-CFG is compatible with the SDR device. If the DM 120 determines that the downloaded R-CFG is incompatible with the SDR device, an error message ERR_3 is returned, informing the server 140 that the SDR device received an invalid R-CFG. The connection is then terminated.

Figure 8:
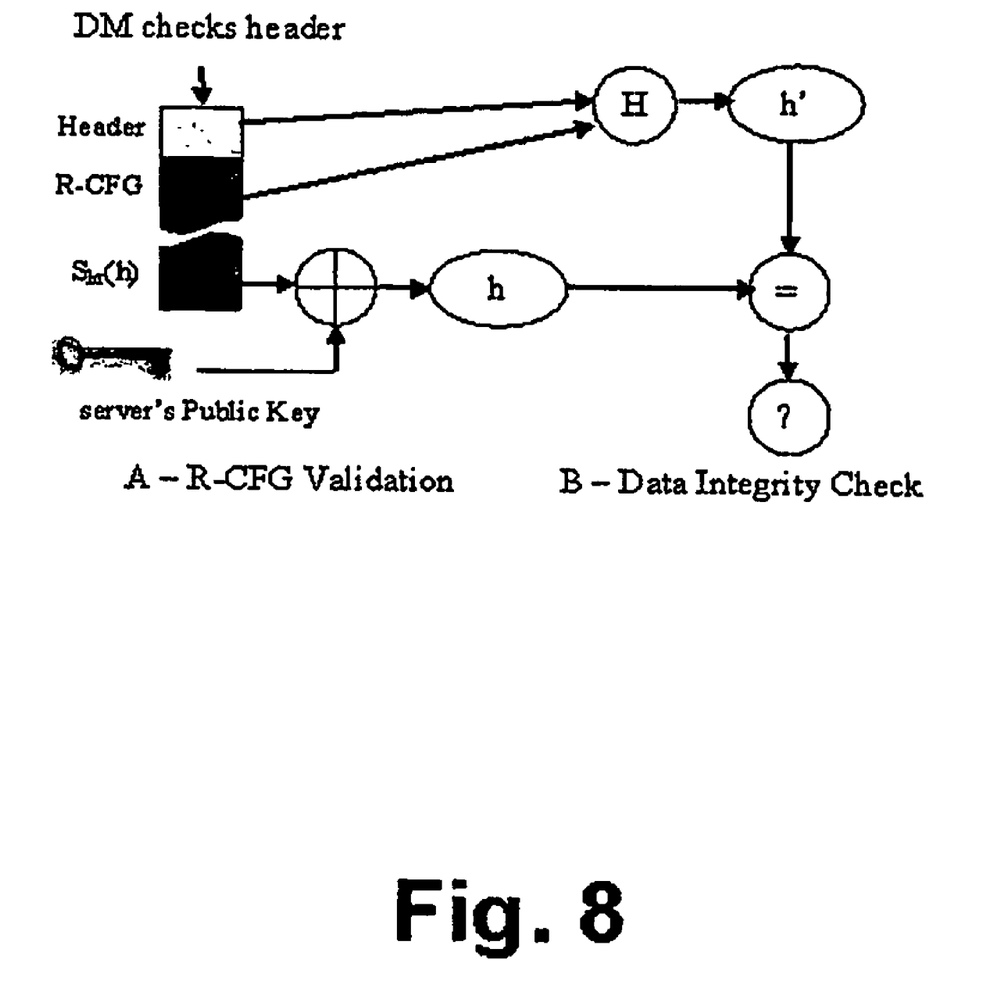
FIG. 8 illustrates a R-CFG validation and a data integrity check in accordance with one embodiment of the invention.

The security computations involve validation and/or a data integrity check of the R-CFG. Validation typically involves ensuring that the R-CFG has regulatory preapproval for use on a particular SDR device, the R-CFG is digitally signed, and is appropriate for the SDR device. There are many techniques that may be used to validate the R-CFG. For example, some or all of this information may be verified through a public-private key mechanism. To illustrate, after downloading the R-CFG, a header associated with the R-CFG, and a signature $S_{kr}(h)$ to the SDR device, the DM 120 checks the header to ensure the R-CFG is appropriate for the SDR device. The DM 120 then verifies the digital signature by using the public key as shown in FIG. 8. The public key may be from the RA, an entity working on behalf of the RA, or some other type of business.

Figure 7:
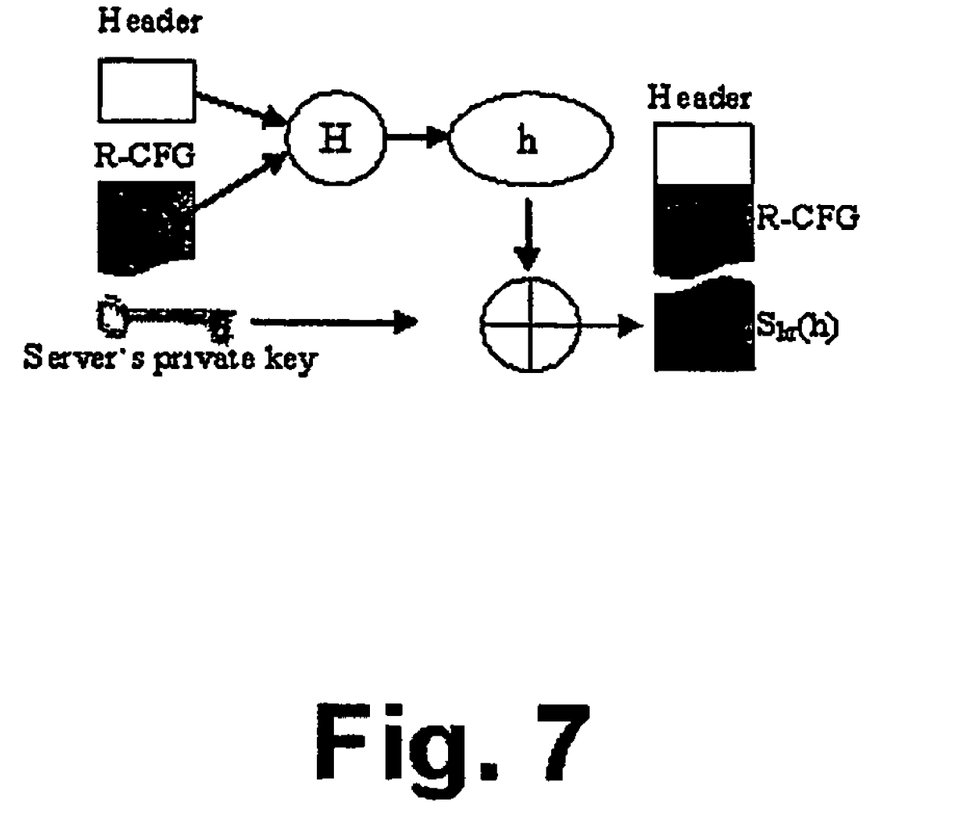
FIG. 7 illustrates a signing operation between a regulatory agency and a SDR manufacturer that generates R-CFG files in accordance with one embodiment of the invention.

Skilled artisans appreciate that prior to the DM 120 downloading the R-CFG, the header, and the signature $S_{kr}(h)$, the RA or some other entity inputs both the header and the R-CFG file into a hash function, thereby obtaining a certain hash value h. Generally, this operation may be performed during a time in which the R-CFG is being tested in combination with the SDR device to ensure that the permitted ranges of radio frequency operating parameters cannot be exceeded. After completing this task, value h is then signed with the server's 140 private key $K_r$. FIG. 7 generally depicts the signing operation. The signed hash value, $S_{Kr}(h)$, is returned to the server 140. The signature is accomplished by using a conventional signing techniques such as RSA, ECC, or possibly a NTRU based signature scheme. Through this signature scheme and the public and private key, the DM 120 is able to verify that the downloaded R-CFG s preapproved for its SDR device.

The DM 120 may also verify data integrity of the R-CFG. Data integrity ensures that the R-CFG has been approved, signed, and not improperly modified. This verification is accomplished through a series of operations. First, the DM 120 calculates a new hash value h' by inputting the received header and the R-CFG into the same hash function used when the R-CFG was signed. Second, the DM 120 decrypts the received $E_{Kr}(h)$ to obtain h. Third, the DM 120 compares h and h'. If h=h', then the received R-CFG is signed, approved and the data has not been damaged or modified. Alternatively, if h≠h', the DM 120 rejects the R-CFG. After validation and/or verifying the data integrity of the R-CFG, the DM 120 acknowledges that it has completed its security calculations. In response, the server 140 acknowledges receipt of the completion message from the DM 120.

Figure 5A:
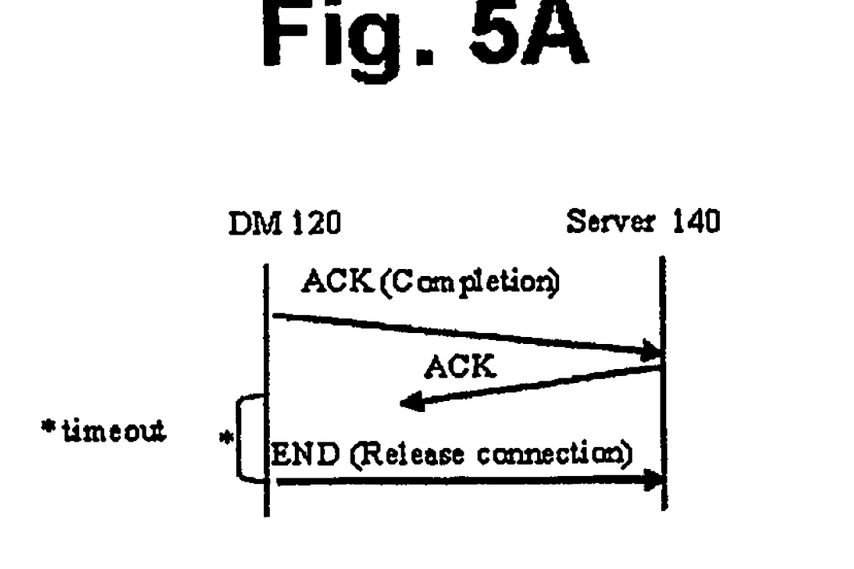
Figure 5B:
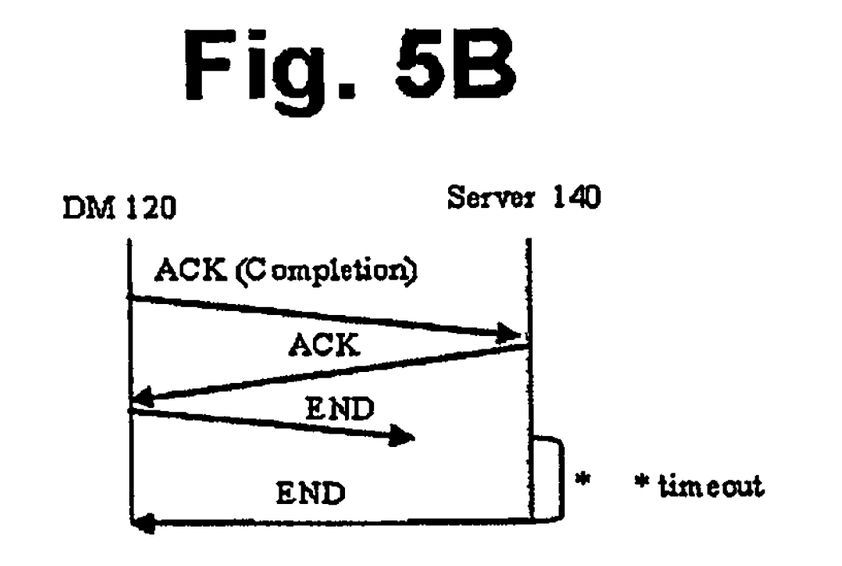

In $M_4$, the DM 120 releases the connection. Errors can occur when exchanging messages in this module. For instance, the server 140 may never receive the completion message from the SDR device. In this case, a timeout period expires and the server 140 voluntarily ends the connection. The next time this SDR device connects to the network using the new R-CFG, the server 140 updates that information in a database. Other typical timeout periods can still occur, as shown in FIGS. 5A-5C. After completing $M_4$, the DM 120 installs and executes the new R-CFG.

In another embodiment to $M_2$ shown in FIG. 1, the server 140 determines whether to allow a R-CFG file to be downloaded to a SDR device. First, the server 140 determines which R-CFG file is requested from a list of R-CFG files available. Second, the server 140 determines whether the R-CFG file is compatible with the SDR device. To be compatible, the R-CFG file must be appropriate for a particular type of SDR device (e.g. model number of the SDR device, version number of the computer program on the SDR device etc.). Additionally, the server 140 cannot allow the SDR device to exceed the radio frequency operating parameters established for the SDR device. To ensure that the radio frequency operating parameters are not exceeded, server 140 only allows preapproved R-CFGs to be downloaded on a particular type of SDR device. In some embodiments, the server can verify that a device is located in an appropriate jurisdiction to receive a particular R-CFG, while allowing the device to determine if the R-CFG is appropriate for the particular device model, etc. The server can use the device's IP address or equivalent as one criteria for determining device location while incorporating anti-spoofing measures to prevent misuse. Alternatively or additionally, the device can be configured to transmit a predetermined jurisdiction identifier with its request.

Figure 6:
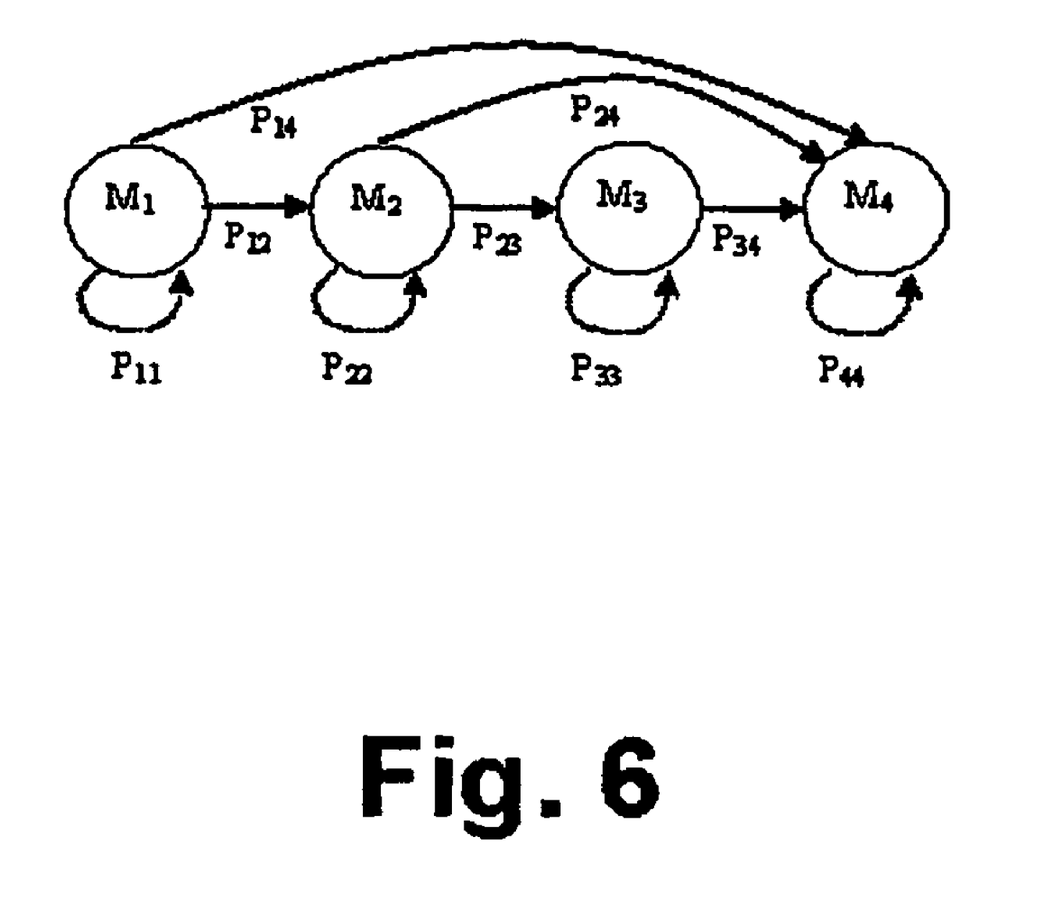
FIG. 6 illustrates state transitions for a communication protocol in accordance with one embodiment of the invention.

Referring now to FIG. 6, the communication protocol of the present invention is shown to be "consistent", since there are no deadlocks, livelocks, and the termination of the process occurs properly. Deadlocks involve two entities competing for at least two resources. The first entity may have access to one resource and the second entity may access to the other resource. Each entity cannot release its control of a resource until it has access to the other resource. In comparison, livelocks occur when two or more processes change their state in response to changes in the other process without doing useful work.

Each state represents one module ($M_1$ through $M_4$) in the communication protocol. An arrow from one state to another state indicates that the protocol's execution successfully flows from this module to the next module with a certain transition probability. For example, the probability to go from the $M_1$ to $M_2$ states is $P_{12}$, the probability to loop in $M_2$ is $P_{22}$, and so on. The probability of correct termination in $M_4$ is $P_t$. Under normal conditions, the probability that the communication protocol's normal execution flow occurs is higher than any other flows, as shown below.

$P_{12}>P_{11}$, $P_{12}>P_{14}$ $P_{23}>P_{22}$, $P_{23}>P_{24}$
$P_{34}>P_{33}$ $P_t>P_{44}$

Referring to FIG. 6, the dotted arrows represent an internal loop in each module due to a timeout repetition. Suppose, for instance, that in $M_2$, a timeout expires after the SDR device requests a R-CFG file. The SDR device resends this request and waits for a response. This can lead to an infinite loop if the timeout happens indefinitely. To avoid this infinite loop, a timeout counter is included in the protocol. When a timeout occurs, the counter is incremented. Each time a message is received, the counter is reset to 0. If the counter reaches a certain number X (i.e., the timeout has occurred X times consecutively), the network is considered congested. In this situation, the SDR device terminates the connection without proceeding to $M_4$ to release the connection.

Whenever the protocol execution reaches $M_4$, the protocol is properly terminated. Improper terminations may occur in three different stages: before, during, or after the R-CFG download. If an improper termination occurs before or during the downloading process, the cause of the improper termination most likely remains and therefore causes the download to occur again. If improper termination occurs after the downloading process is completed, the server 140 receives a message as to whether the SDR device accepted the new R-CFG. This message is sent once the SDR device reconnects to the manufacturer's server 140. Otherwise, $M_4$ terminates the session.

Generally, the communication protocol properly terminates if each message is transmitted with a finite delay. For example, consider a message, $m_i$, being transmitted by the SDR device at time $t_1$. As such, $t_2$ is the time that the server 140 correctly receives $m_i$ and $t_3$ the time at which the SDR device sends $m_{i+1}$. Showing that $t_1<t_2<t_3$ and that $t_3$ is finite, is sufficient to demonstrate liveness, since by induction each message is transmitted with finite delay.

R(t) is the received sequence number as a function of time at the server and S(t) is the transmitted sequence number at the client. N(t) is the sequence number of the next expected transmission (N(t)=R(t)+1)). S(t) is the largest request number received from the manufacturer's server up to time t. Therefore, $S(t) \leq N(t)$ and $N(t) \leq i$. This is due to the fact that R(t) is incremented to i+1 at $t_2$, and S(t) is incremented to i+1 at $t_3$ and $S(t) \leq N(t)$ it follows that $t_2<t_3$.

The SDR device transmits $m_i$ repeatedly, with a finite timeout between retransmission, from $t_1$ until it is first received error-free at $t_2$. Since there is a probability p>0 that each transmission is received correctly, an error-free reception eventually occurs and $t_2$ is finite. $t_3$ is finite using a similar argument from the server-side. The server-side consistency is obtained by applying similar principles described above.

Figure 9:
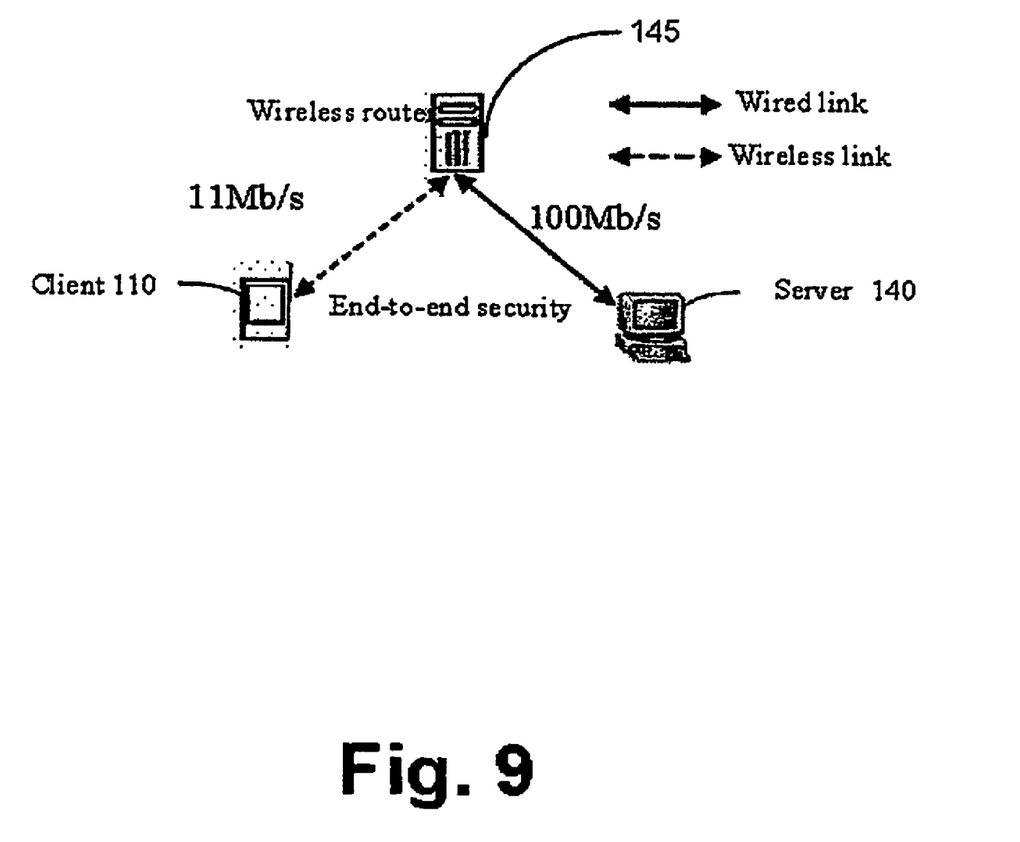
FIG. 9 illustrates a client connecting with a wireless router to a server in accordance with one embodiment of the invention.

Referring now to FIG. 9, a server 140, a router 145, and a client 110 such as a SDR device were used in repetitive experiments to verify the efficiency of the protocol. J2ME was used in each experiment. J2ME is an open, wireless Java platform based on the Java Virtual Machine specifically designed for handheld wireless devices. J2ME used several different types of protocols such as simple HTTP, HTTP plus (denoted as HTTP+sec), LSSL, and SSL.

In these experiments, a 128-bit session key was used to encrypt the communications. Both the client and the server certificates are X.509 certificates. A 1024-bit RSA public/private key pair for our server. The public key is imported to the SDR device to generate a private key used to sign the approved R-CFG. The implemented hash function uses the full version of MD5. MD5 is currently thought to be secure even if MD5 makes only one round.

Figure 10:
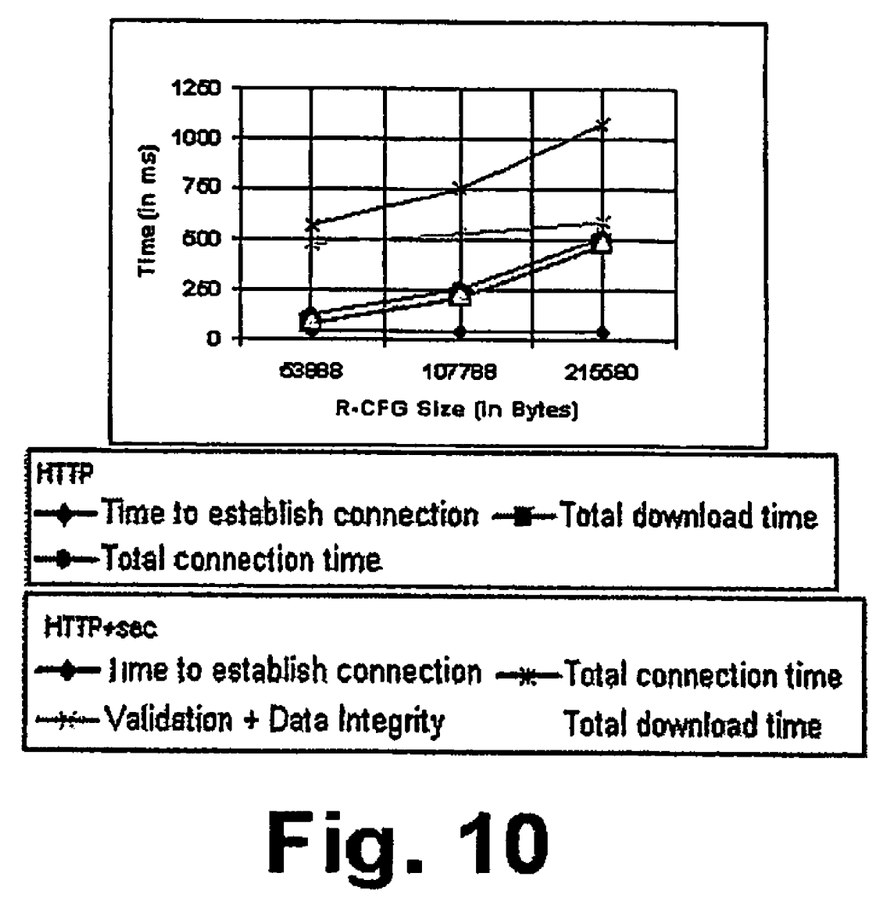
FIG. 10 is a graph illustrating the connection time for the communication protocol in accordance with one embodiment of the invention.
Figure 11:
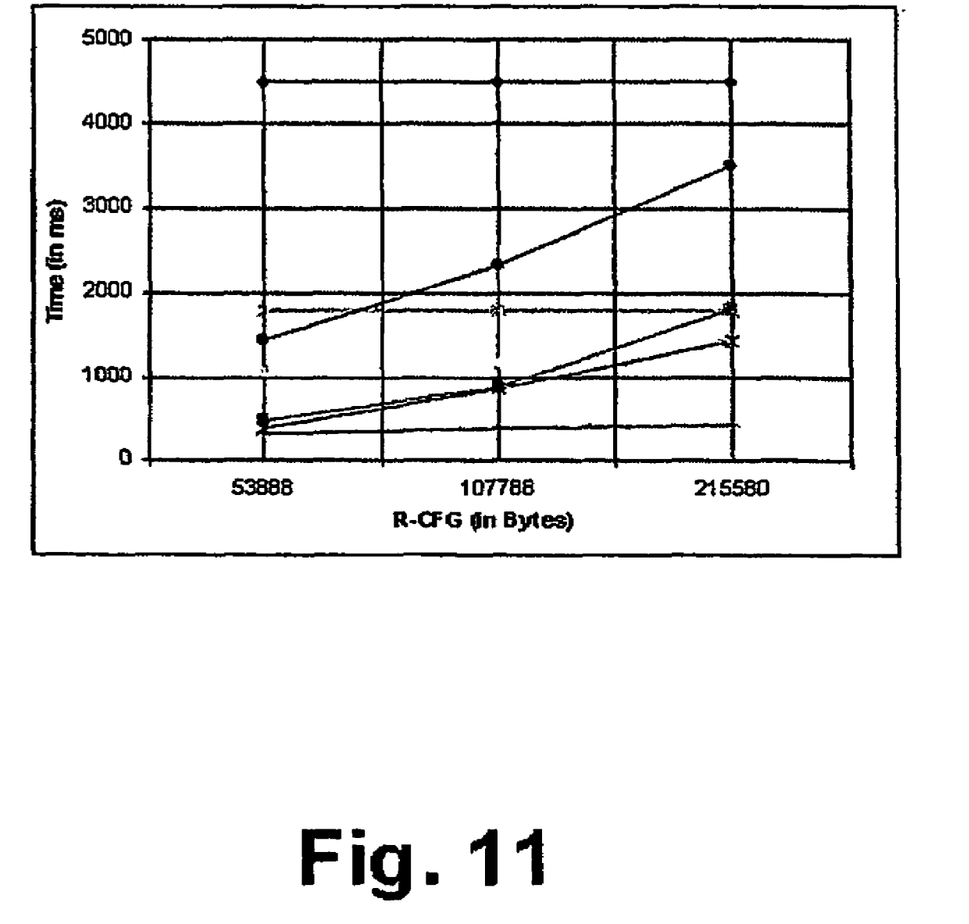
FIG. 11 is a graph illustrating a comparison of secure schemes in accordance with one embodiment of the invention.
Figure 12:
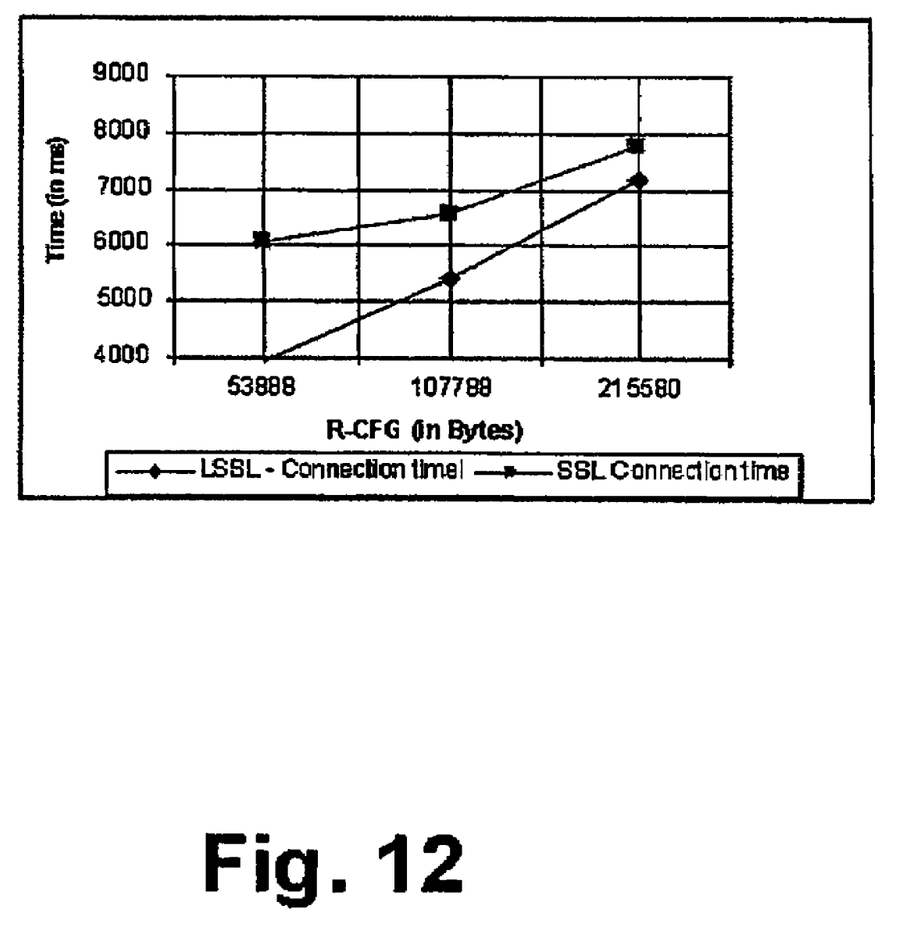
FIG. 12 is a graph illustrating a comparison of secure schemes in accordance with one embodiment of the invention.

In each experiment, different R-CFG files ranging in size from 52 Kilobytes (KB) to 210 KB were transferred. For experiment 1, time measurements were taken to determine the time it took to establish a HTTP connection between the client 110 and the server 140, the total time to download the R-CFG, and the total connection time. For experiments 2, 3, and 4, time measurements were taken to determine the amount of time to establish a HTTP connection, a LSSL or SSL connection, the total time it took to download the R-CFG+signature, the time to validate and check data integrity of the R-CFG, and the total connection time. Each experiment was executed 100 times and the averaged results noted. FIG. 10 shows the performance measurements for experiments 1 and 2. FIGS. 11 and 12 compare the secure scheme of the present invention when using LSSL versus SSL. HTTP+sec performs best when applying the complete scheme since the HTTP+sec does not spend time establishing a secure connection or authenticating end-points. This method could be used when no proprietary information is being transmitted or the payload is already encrypted.

When proprietary information is included in R-CFG, it is preferable to use LSSL or SSL to ensure a secure connection between the SDR device and the server 140. As shown in FIG. 12, LSSL establishes a secure connection much faster than SSL. The time to establish a connection includes the time involved in establishing a socket connection, negotiating a cipher suite (if SSL is used), generating a random number by the client, encrypting the random number with the server's public key, sending the public key it to the server, calculating the session key. The download time is similar for both SSL and LSSL. Thereafter, the SDR device decrypts the R-CFG with the session key. In SSL, decryption is automatically performed. The decryption time is included in the total download time. In LSSL, the implementing directly affects in the decryption time.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A computer-implemented method for downloading a radio configuration (R-CFG) file onto a software defined radio (SDR) device from a server comprising:
   forming a secure connection between the SDR device and the server;
   sending a message that requests the R-CFG to be downloaded over the network from the server to the SDR device;
   downloading the R-CFG from the server to the SDR; and
   using a device manager on the SDR device to inhibit installing of the R-CFG onto the SDR device until after it determines whether the R-CFG is compatible with the SDR device.

2. The computer-implemented method of claim 1, wherein the R-CFG is compatible with the SDR device provided that the R-CFG controls at least one radio frequency parameter solely within a permitted level established by a regulatory agency.

3. The computer-implemented method of claim 1, wherein the R-CFG is compatible with the SDR device provided that the R-CFG is configured to execute on a particular type of SDR device.

4. The computer-implemented method of claim 1, wherein a jurisdiction identifier is transmitted with the message.

5. The computer-implemented method of claim 4, wherein the jurisdiction identifier can be modified by a user of the SDR device.

6. A method for downloading a R-CFG file onto a SDR device from a server comprising:
   forming a secure connection between the SDR device and the server;
   receiving a message that requests the R-CFG to be downloaded to the SDR device;
   determining a type of SDR device to receive the R-CFG from the request message;
   making a determination based on the SDR device type whether the R-CFG file is configured to control a plurality of radio frequency parameters solely within permitted levels established by a regulatory agency; and
   uploading the R-CFG from the server to the SDR based on the determination.

7. A method for downloading a radio configuration (R-CFG) file onto a software defined radio (SDR) device from a server comprising:
   forming a secure connection between the SDR device and the server;
   receiving a message that requests the R-CFG to be downloaded to the SDR device;
   determining a type of SDR device to receive the R-CFG from the request message;
   making a determination whether the R-CFG file is compatible with the SDR device; and
   uploading the R-CFG from the server to the SDR based on the determination.

8. The computer-implemented method of claim 7, wherein the R-CFG is compatible with the SDR device provided that the R-CFG is configured to execute on a particular type of SDR device.

9. The computer-implemented method of claim 7, wherein a jurisdiction identifier is transmitted with the message.

10. The computer-implemented method of claim 7, wherein the jurisdiction identifier can be modified by a user of the SDR device.

11. An apparatus comprising:
    storage media including instructions stored thereon which when executed cause a computer system to perform a method including:
    forming a secure connection between the SDR device and a server of the computer system;
    receiving a message that requests the R-CFG to be downloaded to the SDR device;
    determining a type of SDR device to receive the R-CFG from the request message;
    making a determination whether the R-CFG file is compatible with the SDR device; and
    uploading the R-CFG from the server to the SDR based on the determination.

12. The apparatus of claim 11, wherein the R-CFG is compatible with the SDR device provided that the R-CFG is configured to execute on a particular type of SDR device.

13. The apparatus of claim 11, wherein a jurisdiction identifier is transmitted with the message.

14. The computer-implemented method of claim 11, wherein the jurisdiction identifier can be modified by a user of the SDR device.

* * * * *